(12) United States Patent
Atsumi

(10) Patent No.: US 11,967,463 B2
(45) Date of Patent: Apr. 23, 2024

(54) CERAMIC ELECTRONIC DEVICE

(71) Applicant: TAIYO YUDEN CO., LTD., Tokyo (JP)

(72) Inventor: Teruo Atsumi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 55 days.

(21) Appl. No.: 17/827,347

(22) Filed: May 27, 2022

(65) Prior Publication Data

US 2022/0415574 A1 Dec. 29, 2022

(30) Foreign Application Priority Data

Jun. 23, 2021 (JP) .................................. 2021-104045

(51) Int. Cl.
*H01G 4/012* (2006.01)
*H01G 4/30* (2006.01)

(52) U.S. Cl.
CPC ............... *H01G 4/012* (2013.01); *H01G 4/30* (2013.01)

(58) Field of Classification Search
None
See application file for complete search history.

(56) References Cited

U.S. PATENT DOCUMENTS

| 10,020,125 | B1* | 7/2018 | Phillips | .............. H01B 3/10 |
| 10,062,522 | B1* | 8/2018 | Phillips | .............. H01G 11/62 |
| 2008/0212257 | A1 | 9/2008 | Sakamoto et al. | ............ 361/305 |
| 2013/0094118 | A1 | 4/2013 | Kim et al. | ............ 361/301.4 |
| 2013/0321979 | A1* | 12/2013 | Park | .................. H01G 4/30 |
| | | | | 977/773 |
| 2014/0104748 | A1 | 4/2014 | Park et al. | .................... 361/303 |

FOREIGN PATENT DOCUMENTS

| JP | 10-12476 A | 1/1998 | |
| JP | 11-31633 A | 2/1999 | |
| JP | 2001006971 A | * 1/2001 | ............. H01G 4/005 |
| JP | 2006-332334 A | 12/2006 | |
| JP | 2011-228023 A | 11/2011 | |
| JP | 2013-89944 A | 5/2013 | |
| JP | 2014-82435 A | 5/2014 | |
| JP | 2015-131982 A | 7/2015 | |
| JP | 2016-192477 A | 11/2016 | |
| JP | 2018-56433 A | 4/2018 | |

* cited by examiner

*Primary Examiner* — Eric W Thomas
(74) *Attorney, Agent, or Firm* — Stein IP, LLC

(57) ABSTRACT

A ceramic electronic device includes a multilayer structure in which each of a plurality of dielectric layers of which a main component is ceramic and each of a plurality of internal electrode layers having pores are alternately stacked. A continuity modulus of at least one of the plurality of internal electrode layers is 80% or less. An average pore diameter of the pores of the at least one of the plurality of internal electrode layers is equal to or less than each thickness of the plurality of dielectric layers.

8 Claims, 10 Drawing Sheets

CERAMIC ELECTRONIC DEVICE

CROSS-REFERENCE TO RELATED APPLICATION

This application is based upon and claims the benefit of priority of the prior Japanese Patent Application No. 2021-104045, filed on Jun. 23, 2021, the entire contents of which are incorporated herein by reference.

FIELD

A certain aspect of the present disclosure relates to a ceramic electronic device.

BACKGROUND

Recently, electronic devices such as smart phones are downsized. And, the electronic devices have high performance. Therefore, downsizing of ceramic electronic devices mounted on the electronic devices is requested. However, for example, when a chip size of the ceramic electronic devices is reduced, an area of internal electrode layers facing dielectric layers is also reduced. In this case, electrostatic capacity is also reduced. In order to secure the electrostatic capacity and reduce the chip size, high density stacking, in which thicknesses of the dielectric layers and thicknesses of the internal electrode layers are reduced and the number of stacked layers is increased, is requested. Moreover, it is necessary to improve the performance of the dielectric layers such as dielectric constant. The electrostatic capacity is inversely proportional to the thickness of the dielectric layers, in the following formula. It is therefore effective to reduce the thickness of the dielectric layers.

$$C = \varepsilon \times S/d$$

C: electrostatic capacity [F], ε: dielectric constant of dielectric material [F/n], S: electrode area [m²], interval of electrodes (thickness of the dielectric layers): d [m]

SUMMARY OF THE INVENTION

According to a first aspect of the embodiments, there is provided a ceramic electronic device including: a multilayer structure in which each of a plurality of dielectric layers of which a main component is ceramic and each of a plurality of internal electrode layers having pores are alternately stacked, wherein a continuity modulus of at least one of the plurality of internal electrode layers is 80% or less, and wherein an average pore diameter of the pores of the at least one of the plurality of internal electrode layers is equal to or less than each thickness of the plurality of dielectric layers.

DETAILED DESCRIPTION

Multilayer ceramic capacitors are formed by stacking a dielectric green sheet and metal conductive paste including metal particles such as Ni or Cu, and sintering and contracting the dielectric green sheet and the metal conductive paste. In this case, a sintering starting temperature of the metal particles is largely different from a sintering starting temperature of the dielectric material. Therefore, a difference between the contraction of the metal conductive paste in a firing process and the contraction of the dielectric green sheet in the firing process becomes large. In this case, structural defect such as a pore occurs in the internal electrode layer. Thereby, a continuity modulus of the internal electrode layer may be reduced. When the continuity modulus is reduced, performance degradation such as reduction or variation of electrostatic capacity may occur. Alternatively, the internal electrode layer may be broken. In this case, the function of a capacitor cannot be achieved.

In order to improve the continuity modulus of the internal electrode layer, many things have been studied. For example, in order to decrease the difference between the contraction of the metal conductive paste and the contraction of the dielectric green sheet in the firing process, there are proposed many methods of adding a co-material made of ceramic in the metal conductive paste (for example, see Japanese Patent Application Publication No. 2014-082435). There are proposed methods of improving wettability between the metal conductive paste and the dielectric green sheet by adding a metal element such as Ca, Mg, Ba or Mn to the metal conductive paste (for example, see Japanese Patent Application Publication No. 2016-192477). There are proposed methods of adjusting sintering characteristic of Ni by forming a coating film on Ni particles of the metal conductive paste (for example, see Japanese Patent Application Publication No. 2015-131982). There are proposed methods of improving resistance of Ni to heat by adding Pt or Au in the metal conductive paste (for example, see Japanese Patent Application Publication No. 2011-228023).

On the other hand, when the continuity modulus of the internal electrode layer becomes large, stress caused by the difference of the contraction between the internal electrode layer and the dielectric layer during the firing process is not absorbed. In this case, crack may easily occur. Therefore, there are proposed methods of limiting the continuity modulus (for example, see Japanese Patent Application Publication No. 2013-089944, Japanese Patent Application Publication No. 2006-332334, Japanese Patent Application Publication No. H11-031633, and Japanese Patent Application Publication No. H10-012476). However, when the continuity modulus is limited, the electrostatic capacity may be reduced.

Hereinafter, an exemplary embodiment will be described with reference to the accompanying drawings.

Exemplary Embodiment

Figure 1:
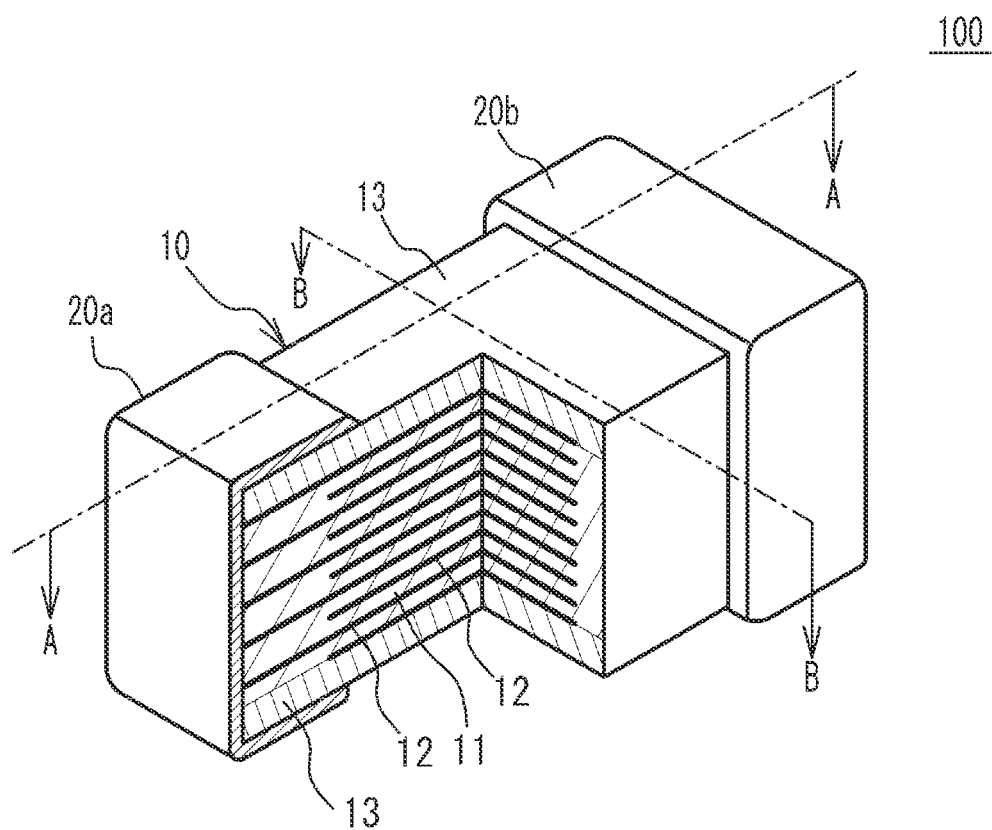
FIG. 1 is a partial cross-sectional perspective view of a multilayer ceramic capacitor.
Figure 2:
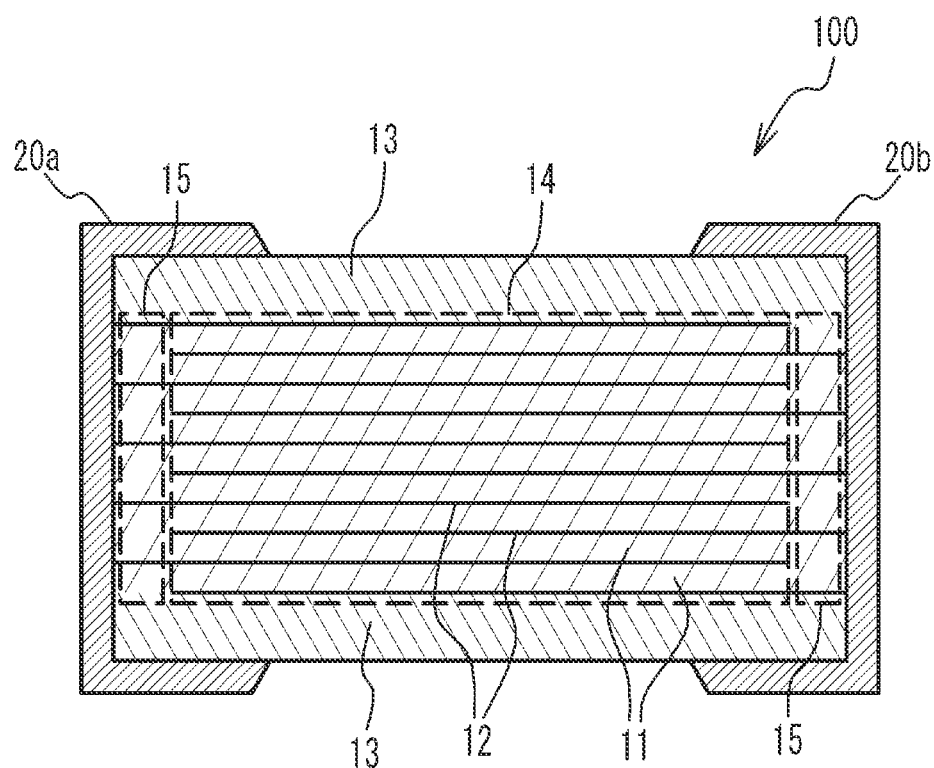
FIG. 2 is a cross-sectional view taken along line A-A in FIG. 1.
Figure 3:
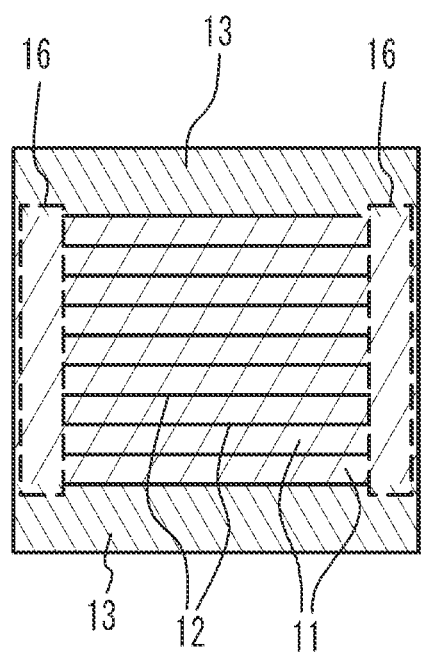
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. The internal electrode layer 12 contains a base metal. End edges of the internal electrode layers 12 are alternately exposed to a first end face of the multilayer chip 10 and a second end face of the multilayer chip 10 that is different from the first end face. The external electrode 20a is provided on the first end face. The external electrode 20b is provided on the second end face. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them.

The dielectric layer 11 is mainly composed of a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin 15. The section where the internal electrode layers 12 connected to the external electrode 20b face each other with no internal electrode layer 12 connected to the external electrode 20a interposed therebetween is also the end margin 15. That is, the end margin 15 is a section where the internal electrode layers 12 connected to one of the external electrodes face each other with no internal electrode layer 12 connected to the other of the external electrodes interposed therebetween. The end margin 15 is a section where no capacity is generated.

As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12. The side margin 16 is a section where no capacity is generated.

Figure 4:
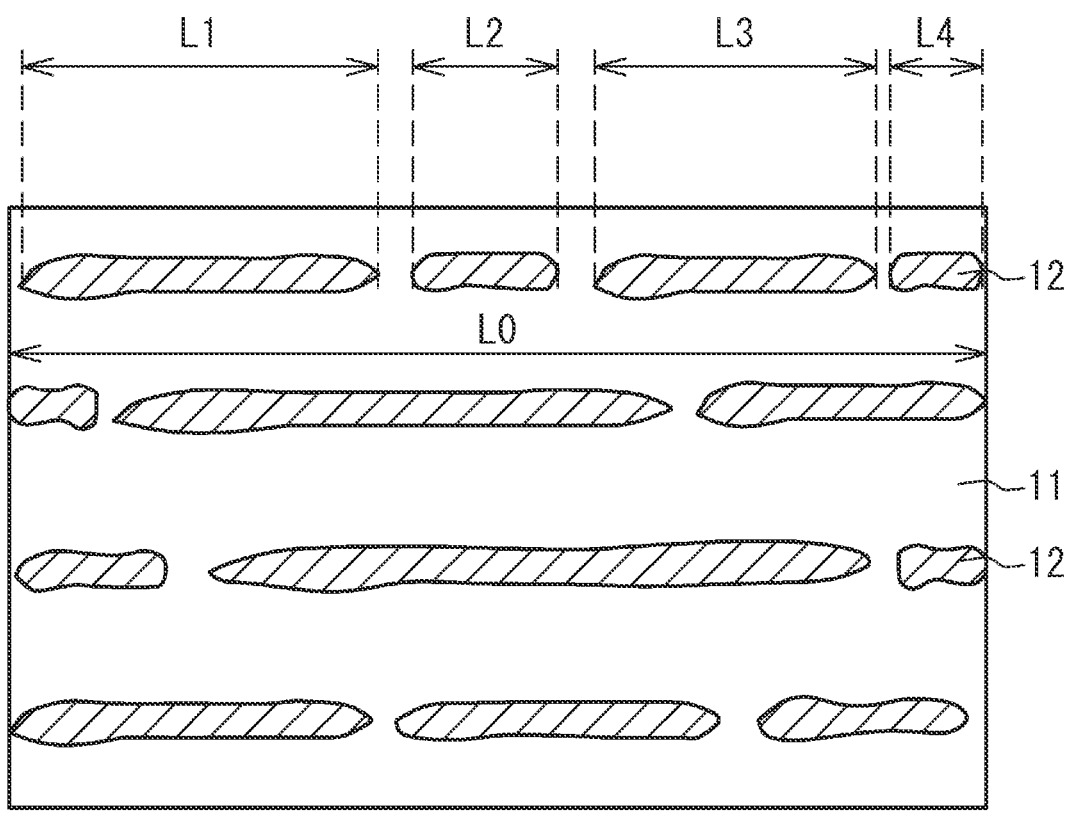
FIG. 4 illustrates a continuity modulus of an internal electrode layer.

FIG. 4 illustrates the continuity modulus of the internal electrode layer 12. As illustrated in FIG. 4, in an observation area having a length L0 in the internal electrode layer 12, lengths L1, L2 to Ln of metal portions are measured and summed. A ratio of the metal portions $\Sigma$ Ln/Lo can be defined as the continuity modulus. For example, the observation area of which L0 is 20 μm which is 20 times as the thickness of the dielectric layer 11 which is 1 μm.

When the continuity modulus of the internal electrode layer 12 is enlarged, it is possible to suppress decrease or variation of electrostatic capacity of the multilayer ceramic capacitor 100. However, the electrostatic capacity is not determined by only the continuity modulus. When the continuity modulus of the internal electrode layer 12 is excessively large, stress caused by a difference of a contraction factor between the internal electrode layer 12 and the dielectric layer 11 during the sintering is not absorbed. In this case, crack may easily occur.

The present inventors have found that it is possible to suppress occurrence of crack and improve the electrostatic capacity by controlling an average value of diameters of pores (hereinafter referred to an average pore diameter) in the internal electrode layer 12, in addition to the continuity modulus of the internal electrode layer 12. Details will be described. In the following description, the internal electrode layer of which the continuity modulus and the average pore diameter are controlled may be a part of the internal electrode layers 12 of the multilayer ceramic capacitor 100 or all of the internal electrode layers 12 of the multilayer ceramic capacitor 100.

Figure 5:
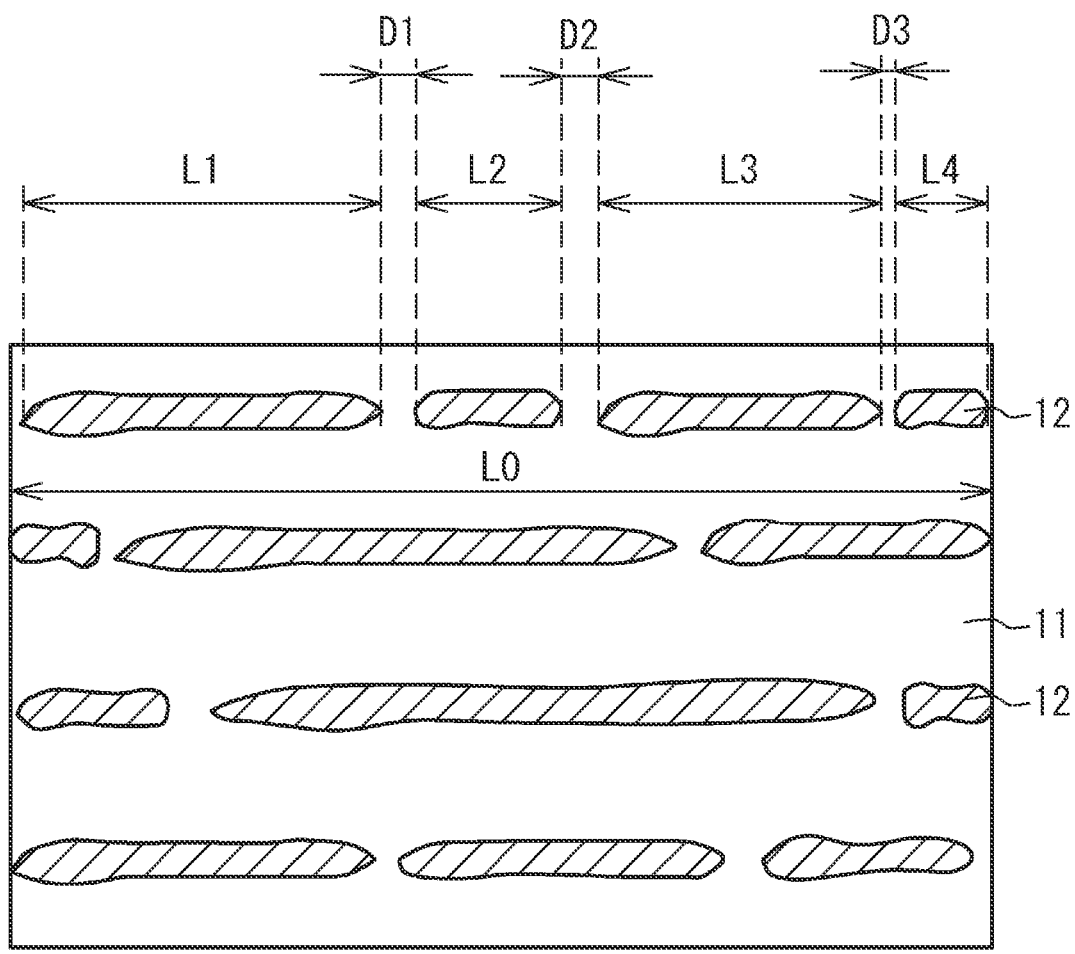
FIG. 5 illustrates a calculation method of an average pore diameter.

The average pore diameter in the internal electrode layer 12 can be obtained, for example, based on the following measurement. First, as illustrated in FIG. 5, in an observation region of length L0 in the internal electrode layer 12, the lengths D1, D2, . . . , Dm of the portions (pores) in which no metal is present are measured and summed. The average value ΣDm/m is obtained by dividing the summed value by the number of the lengths "m". Here, it is assumed that the pore formed in the internal electrode layer 12 is a pore that penetrates the internal electrode layer 12 in the thickness direction, and is, for example, a cylindrical shape. The pores may be in a vacuum state, air may remain, or ceramic components may remain. If the cross section of the cross section figure passes through the center of the pore, Dm is equal to the diameter of the pore. If the cross section of the cross section figure deviates from the center of the pore, Dm is smaller than the diameter of the pore. The expected value of the pore diameter is 4/π×Dm, which is obtained by multiplying Dm by 4/π(≈1.2724). Therefore, the average pore diameter can be defined as 4/π×ΣDm/m. Further, the continuity modulus and the average pore diameter may be measured by a method as in Japanese Patent Application Publication No. 2018-056433. Although it does not depend on the measuring method, it is desirable to measure and obtain as many points as possible. In the observation region of length L0, the average pore diameter may be calculated by extracting only the pores whose Dm is 1/10 or more of the thickness of the dielectric layer 11.

When the continuity modulus of the internal electrode layer 12 decreases, the capacity also decreases. However, it is difficult to accurately determine how much the electrostatic capacity decreases by experiments. The reason is that it is difficult to completely control the structure such as the thickness of the dielectric layer 11, the thickness of the internal electrode layer 12, the continuity modulus of the internal electrode layer 12, and the area of the internal electrode layer 12 to make the multilayer ceramic capacitor 100. However, these problems are unlikely to occur in computer simulations. Therefore, the electrostatic capacity of the multilayer ceramic capacitor 100 when the continuity modulus of the internal electrode layer 12 and the average pore diameter are changed is obtained by the electric field analysis of the computer simulation. As the simulation software for electrolytic analysis, Ansys Maxwell 2020 R1, an electromagnetic field analysis software manufactured by Ansys, is used.

FIG. 6A to FIG. 7D illustrate some examples of the model used in the simulation. As illustrated in FIG. 6A to FIG. 7D, each model is a model obtained by cutting out the inside of the multilayer ceramic capacitor 100. In this model, the boundary conditions are set so that the pattern of the same structure is repeated. Therefore, this model is a model in which cylindrical pores penetrating the internal electrode layer 12 are regularly arranged. Moreover, the required electrostatic capacity is per unit volume or unit area. As the conditions of the simulation, the thickness of the dielectric layer 11 is 1 μm, and the relative dielectric constant εR is 5,000.

Figure 6B:
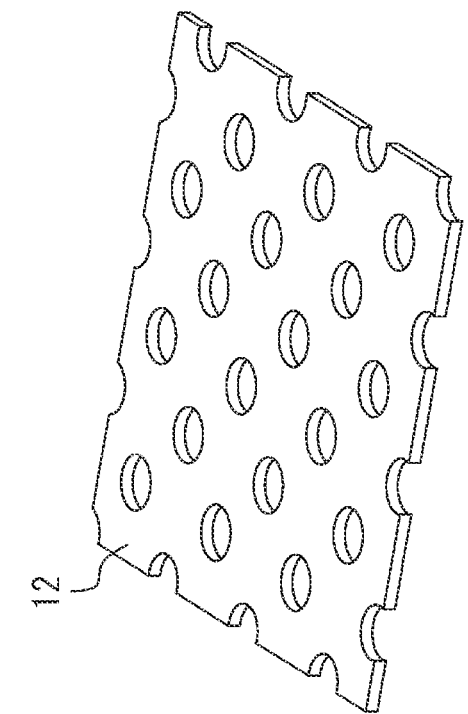
FIG. 6A to FIG. 6D illustrate a part of a model used for a simulation.
Figure 6D:
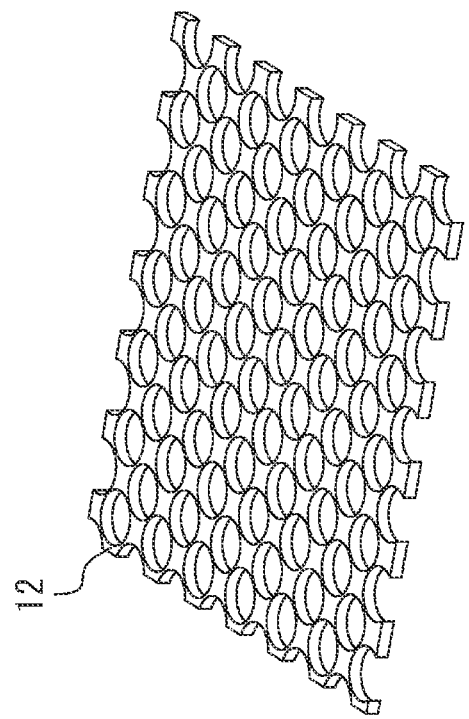
Figure 6A:
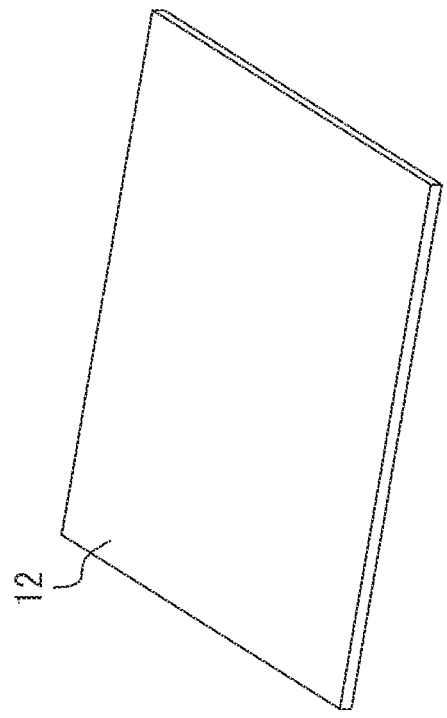
Figure 6C:
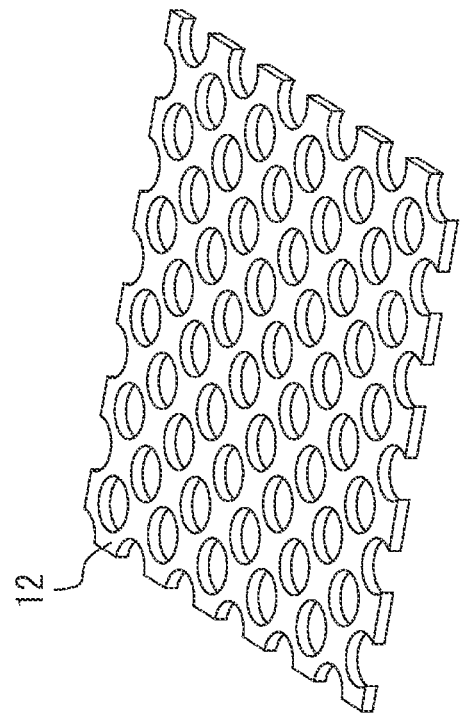

In a model of FIG. 6A, the continuity modulus of the internal electrode layer 12 is 100%. There is no pore in the internal electrode layer 12. Therefore, an average pore diameter is 0. In a model of FIG. 6B, the continuity modulus of the internal electrode layer 12 is 80%. The average pore diameter of the internal electrode layer 12 is 1 μm. In a model of FIG. 6C, the continuity modulus of the internal electrode layer 12 is 50%. The average pore diameter of the internal electrode layer 12 is 1 μm. In a model of FIG. 6D, the continuity modulus of the internal electrode layer 12 is 30%. The average pore diameter of the internal electrode layer 12 is 1 μm. As apparent from the models, even if the average pore diameter is equal to each other, positions in which a metal component exists in the internal electrode layer 12 are different from each other in the models having a different continuity modulus.

Figure 7A:
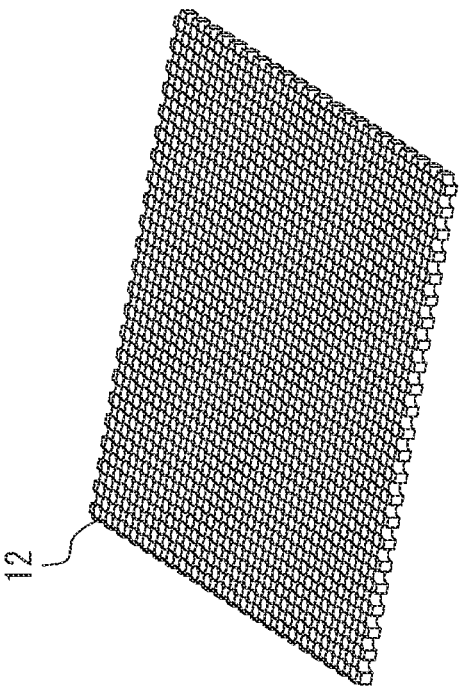
FIG. 7A to FIG. 7D illustrate a part of a model used for a simulation.
Figure 7B:
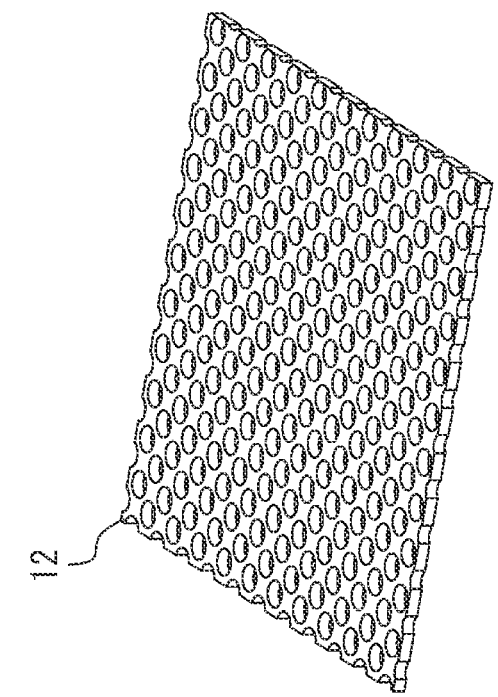
Figure 7C:
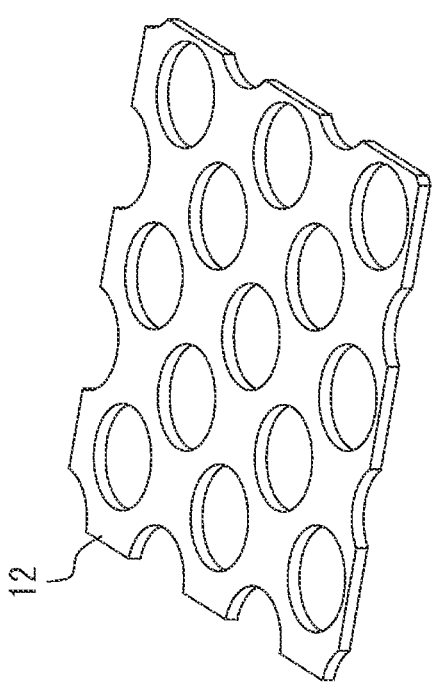
Figure 7D:
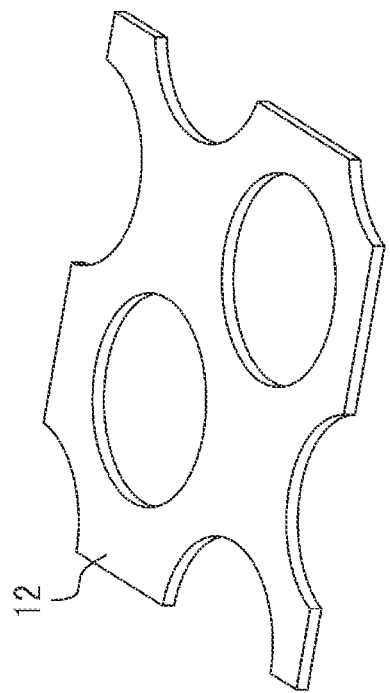

In a model of FIG. 7A, the continuity modulus of the internal electrode layer 12 is 50%. The average pore diameter of the internal electrode layer 12 is 0.25 μm. In a model of FIG. 7B, the continuity modulus of the internal electrode layer 12 is 50%. The average pore diameter of the internal electrode layer 12 is 0.5 μm. In a model of FIG. 7C, the continuity modulus of the internal electrode layer 12 is 50%. The average pore diameter of the internal electrode layer 12 is 2 μm. In a model of FIG. 7D, the continuity modulus of the internal electrode layer 12 is 50%. The average pore diameter of the internal electrode layer 12 is 4 μm. As apparent from the models, even if the continuity modulus is equal to each other, positions in which a metal component exists in the internal electrode layer 12 are different from each other in the models having a different average pore diameter.

Figure 8:
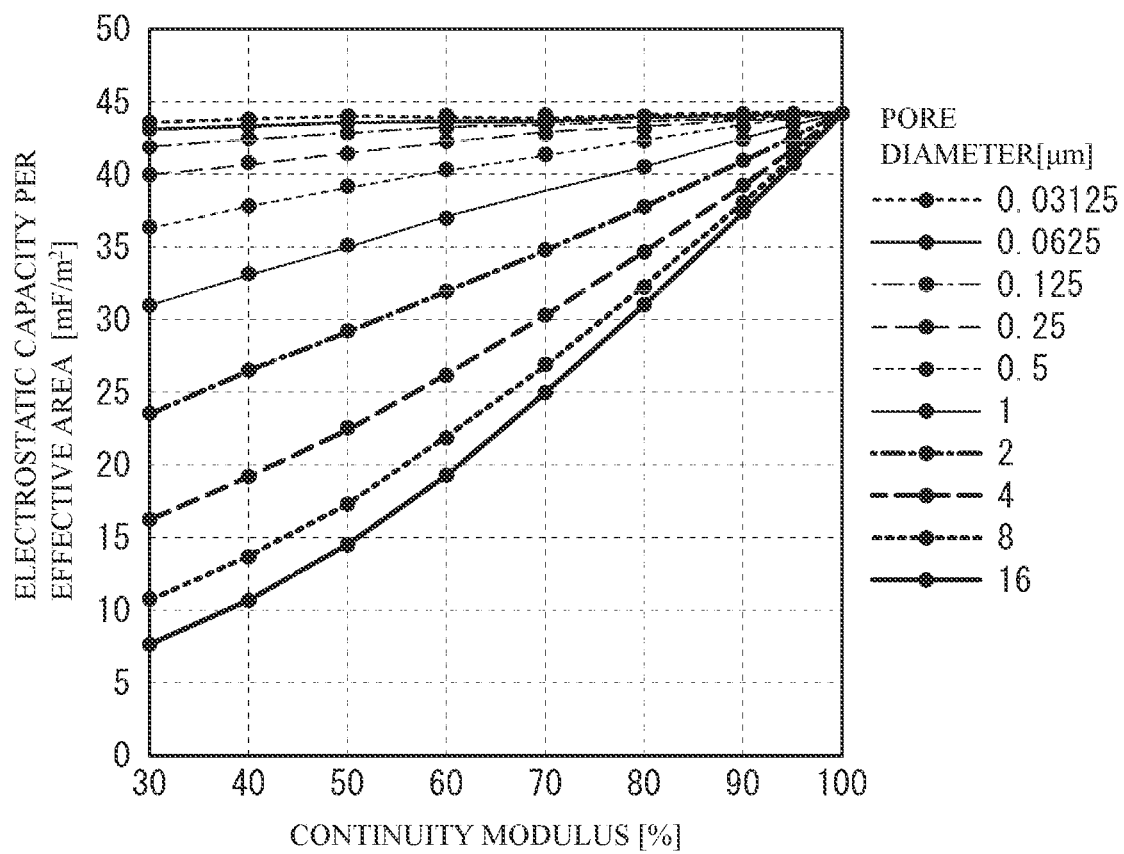
FIG. 8 illustrates a graph of an electrostatic capacity.

Table 1 shows simulated electrostatic capacity. FIG. 8 illustrates a graph of the simulated electrostatic capacity. The electrostatic capacity is an electrostatic capacity [mF/m$^2$] per an effective area. The continuity modulus is respectively 100%, 95%, 90%, 80%, 70%, 60%, 50%, 40%, and 30%. The average pore diameter is respectively 0.03125 μm, 0.0625 μm, 0.125 μm, 0.25 μm, 0.5 μm, 1 μm, 2 μm, 4 μm, 8 μm, and 16 μm. The model of which the continuity modulus is 100% has no pore. Therefore, the average pore diameter of the model of which the continuity modulus is 100% is 0.

TABLE 1

| CONTINUITY MODULUS (%) | AVERAGE PORE DIAMETER (μm) | | | | | | | | | |
|---|---|---|---|---|---|---|---|---|---|---|
| | 0.03125 | 0.0625 | 0.125 | 0.25 | 0.5 | 1 | 2 | 4 | 8 | 16 |
| 100 | 44.27 | 44.27 | 44.27 | 44.27 | 44.27 | 44.27 | 44.27 | 44.27 | 44.27 | 44.27 |
| 95 | 44.25 | 44.23 | 44.18 | 44.09 | 43.85 | 43.41 | 42.67 | 41.81 | 41.16 | 40.79 |
| 90 | 44.23 | 44.17 | 44.06 | 43.83 | 43.36 | 42.47 | 41.04 | 39.39 | 38.15 | 37.43 |
| 80 | 44.16 | 44.05 | 43.82 | 43.33 | 42.39 | 40.65 | 37.88 | 34.75 | 32.43 | 31.09 |
| 70 | 44.10 | 43.92 | 43.55 | 42.81 | 41.42 | 38.89 | 34.91 | 30.38 | 27.01 | 25.09 |
| 60 | 44.03 | 43.77 | 43.25 | 42.24 | 40.37 | 37.07 | 32.03 | 26.25 | 21.88 | 19.38 |
| 50 | 43.94 | 43.59 | 42.91 | 41.60 | 39.20 | 35.16 | 29.22 | 22.52 | 17.39 | 14.47 |
| 40 | 43.83 | 43.39 | 42.52 | 40.88 | 37.94 | 33.17 | 26.54 | 19.29 | 13.74 | 10.61 |
| 30 | 43.70 | 43.14 | 42.03 | 39.96 | 36.40 | 30.89 | 23.72 | 16.31 | 10.75 | 7.63 |

From the results of Table 1 and FIG. 8, in the models other than the model of which the continuity modulus is 100%, the electrostatic capacity decreases as the continuity modulus decreases, with respect to each average pore diameter. However, the degree of decrease largely changes according to the average pore diameter. That is, the larger the average pore diameter is, the larger the degree of decrease of the electrostatic capacity is. The smaller the average pore diameter is, the smaller the degree of decrease of the electrostatic capacity is. Therefore, even if the continuity modulus is equal to each other, the electrostatic capacity can be enlarged when the average pore diameter is reduced. It is thought that the degree of decrease of the electrostatic capacity changes according to the average pore diameter because when the pore is large, a ratio of a region, in which an electric field cannot go around and the electrostatic capacity is not generated, increases in the capacity section 14.

Figure 9:
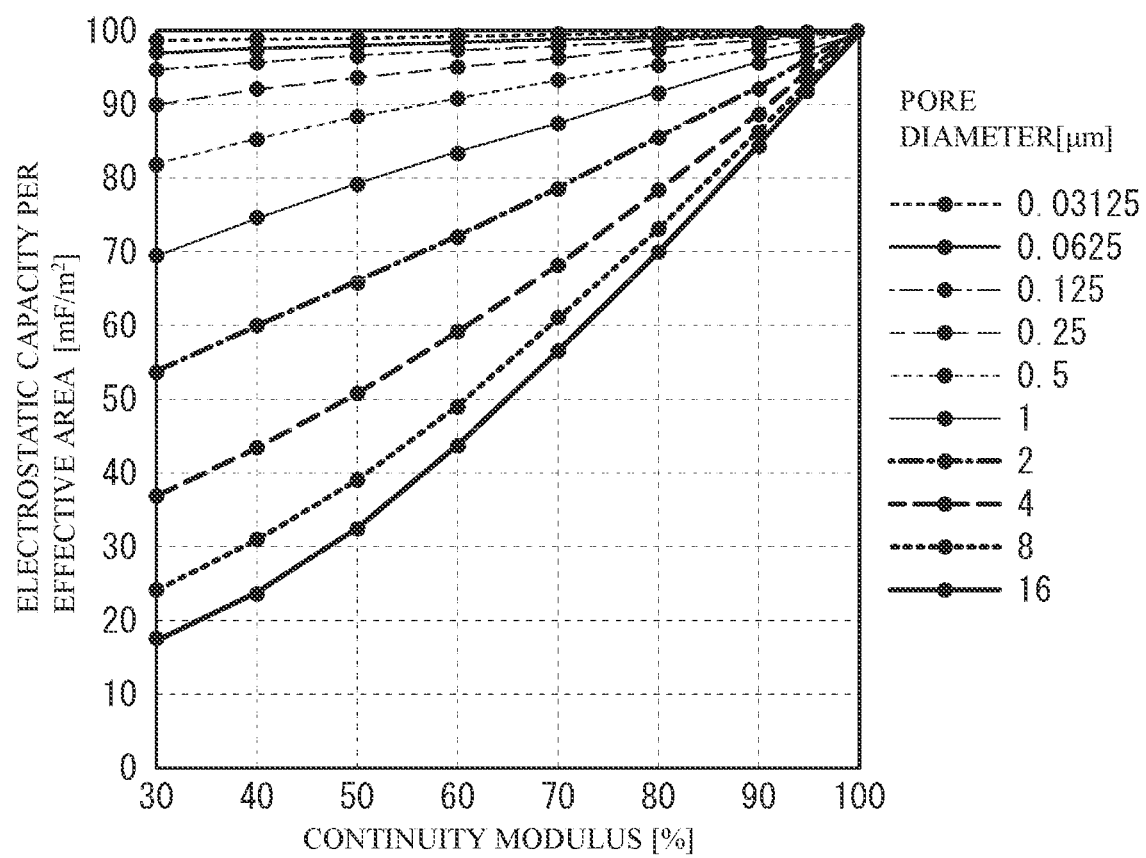
FIG. 9 illustrates a graph of an electrostatic capacity retention rate.

Next, the ratio from the electrostatic capacity of the model with the continuity modulus of 100% is defined as the electrostatic capacity retention rate. Table 2 shows the obtained electrostatic capacity retention rate. FIG. 9 shows a graph of the obtained electrostatic capacity retention rate. The electrostatic capacity retention rate also shows the same tendency as the electrostatic capacity. The degree of decrease in the electrostatic capacity retention rate according to the continuity modulus varies greatly depending on the average pore size. In particular, the difference is remarkable when the continuity modulus is 80% or less. Moreover, when the average pore diameter is set to 1 μm or less, it is possible to effectively prevent the decrease in the electrostatic capacity retention rate due to the decrease in the continuity modulus.

effectively prevented by making the average pore diameter 1 μm or less. In other words, it is possible to effectively prevent the decrease in the electrostatic capacity, when the average pore diameter is the thickness of the dielectric layer 11 or less.

From the above results, when the continuity modulus of the internal electrode layer 12 is 80% or less, the average pore diameter of the internal electrode layer 12 is set to be equal to or less than the thickness of the dielectric layer 11 to design the high-performance multilayer ceramic capacitor 100. For example, it is possible to design the unprecedented multilayer ceramic capacitor 100 that maintains a high electrostatic capacity by reducing the average pore diameter while suppressing the generation of cracks by lowering the continuity modulus of the internal electrode layer 12.

From a view point of effectively suppressing reduction of the retention rate of the electrostatic capacity, when the continuity modulus of the internal electrode layer 12 is 80% or less, it is preferable that the average pore diameter of the internal electrode layer 12 is 0.9 times or less of the thickness of the dielectric layer 11. It is more preferable that the average pore diameter is 0.8 times or less of the thickness of the dielectric layer 11. It is still more preferable that the average pore diameter is 0.5 times or less of the thickness of the dielectric layer 11.

When the continuity modulus of the internal electrode layer 12 is excessively small, sufficient electrostatic capacity may not be necessarily achieved. Accordingly, it is preferable that the continuity modulus of the internal electrode

TABLE 2

| CONTINUITY MODULUS (%) | AVERAGE PORE DIAMETER (μm) | | | | | | | | | |
|---|---|---|---|---|---|---|---|---|---|---|
| | 0.03125 | 0.0625 | 0.125 | 0.25 | 0.5 | 1 | 2 | 4 | 8 | 16 |
| 100 | 100.00 | 100.00 | 100.00 | 100.00 | 100.00 | 100.00 | 100.00 | 100.00 | 100.00 | 100.00 |
| 95 | 99.96 | 99.90 | 99.80 | 99.58 | 99.06 | 98.06 | 96.38 | 94.44 | 92.96 | 92.13 |
| 90 | 99.90 | 99.78 | 99.51 | 99.01 | 97.94 | 95.94 | 92.71 | 88.97 | 86.16 | 84.56 |
| 80 | 99.76 | 99.51 | 98.98 | 97.87 | 95.75 | 91.82 | 85.56 | 78.50 | 73.24 | 70.23 |
| 70 | 99.61 | 99.20 | 98.37 | 96.70 | 93.55 | 87.85 | 78.85 | 68.63 | 61.02 | 56.67 |
| 60 | 99.45 | 98.86 | 97.70 | 95.42 | 91.18 | 83.74 | 72.34 | 59.29 | 49.42 | 43.77 |
| 50 | 99.24 | 98.46 | 96.92 | 93.96 | 88.56 | 79.42 | 66.01 | 50.86 | 39.28 | 32.69 |
| 40 | 99.01 | 98.02 | 96.05 | 92.33 | 85.70 | 74.93 | 59.95 | 43.58 | 31.04 | 23.97 |
| 30 | 98.71 | 97.43 | 94.93 | 90.27 | 82.23 | 69.78 | 53.57 | 36.84 | 24.27 | 17.23 |

When the relative dielectric constant of the dielectric layer 11 is changed under the current calculation conditions, the electrostatic capacity changes. However, the electrostatic capacity retention rate does not change. This is because the electrostatic capacity of the model with a continuity modulus of 100% and the electrostatic capacity of the model with a continuity modulus of less than 100% change at the same ratio. Therefore, the above result does not depend on the relative dielectric constant of the dielectric layer 11. That is, it does not depend on the material of the dielectric layer 11.

On the other hand, when the thickness of the dielectric layer 11 is changed, both the electrostatic capacity and the electrostatic capacity retention rate change. Here, as for the electrostatic capacity retention rate, the results of the dielectric layer 11 having a thickness of 1 μm and the internal electrode layer 12 having the average pore diameter of 1 μm and the results of the dielectric layer 11 having a thickness of 0.5 μm and the internal electrode layer 12 having the average pore diameter of 0.5 μm are similar to each other in the model. Therefore, the same value is obtained. Therefore, when the thickness of the dielectric layer 11 is 1 μm, the decrease in the electrostatic capacity retention rate can be layer 12 has a lower limit. For example, it is preferable that the continuity modulus of the internal electrode layer 12 is 50% or more. It is more preferable that the continuity modulus is 60% or more. It is still more preferable that the continuity modulus is 70% or more.

It is preferable that the average pore diameter of the internal electrode layer 12 is small, as described on the basis of FIG. 8 and FIG. 9. For example, it is preferable that the average pore diameter of the internal electrode layer 12 is 5 μm or less. It is more preferable that the average pore diameter is 1 μm or less. It is still more preferable that the average pore diameter is 0.5 μm or less.

Each thickness of the dielectric layers 11 may be 0.1 μm or more and 10 μm or less, 0.3 μm or more and 3 μm or less, or 0.5 μm or and 1 μm or less. It is possible to measure each thickness of the dielectric layers 11 by calculating an average of thicknesses at 10 different positions of an image captured by a microscope such as a scanning transmission electron micro scope, after obtaining a cross section of the multilayer ceramic capacitor illustrated in FIG. 2 by a mechanical polishing.

Each thickness of the internal electrode layers 12 may be 0.1 μm or more and 3 μm or less, 0.5 μm or more and 2 μm or less, or 0.8 μm or and 1.2 μm or less. It is possible to measure each thickness of the internal electrode layers 12 by calculating an average of thicknesses at 10 different positions of an image captured by a microscope such as a scanning transmission electron micro scope, after obtaining a cross section of the multilayer ceramic capacitor illustrated in FIG. 2 by a mechanical polishing.

Figure 10:
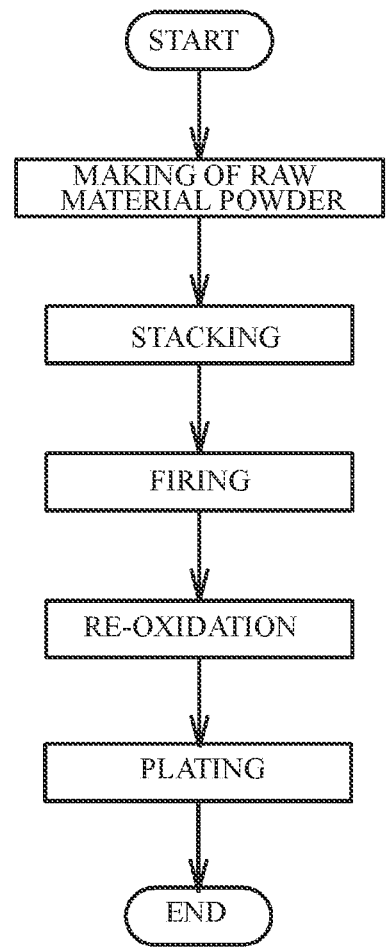
FIG. 10 illustrates a flow of a manufacturing method of a multilayer ceramic capacitor.

Next, the manufacturing method of the multilayer ceramic capacitor 100 will be described. FIG. 10 is a flowchart of the manufacturing method of the multilayer ceramic capacitor 100.

[Making of Raw Material Powder]

A dielectric material for forming the dielectric layer 11 is prepared. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high dielectric constant. This $BaTiO_3$ can be obtained typically by reacting a titanium raw material such as titanium dioxide with a barium raw material such as barium carbonate to synthesize barium titanate. Various methods have been known as a synthesizing method of ceramic constituting the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of Mg (magnesium), Mn (manganese), V (vanadium), Cr (chromium) or an rare earth element (Y (yttrium), Sm (samarium), Eu (europium), Gd (gadolinium), Tb (terbium), Dy (dysprosium), Ho (holmium), Er (erbium), Tm (thulium), or Yb (ytterbium)) or an oxide of Co (cobalt), Ni (nickel), Li (lithium), B (boron), Na (sodium), K (potassium) or Si (silicon), or glass including cobalt, nickel, lithium, boron, sodium, potassium or silicon.

For example, a compound including an additive is wet-blended with the resulting ceramic raw material powder. The resulting ceramic material powder is dried and crushed. Thus, a ceramic material is prepared. For example, the resulting ceramic material is crushed if necessary. Thus, a particle diameter is adjusted. Alternatively, the particle diameter may be further adjusted by a classification process. Thus, a dielectric material is obtained.

[Stacking Process]

Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet is painted on a base material by, for example, a die coater method or a doctor blade method, and then dried.

Next, an internal electrode layer pattern is formed on the surface of the dielectric green sheet by printing a metal conductive paste for forming the internal electrode with use of screen printing or gravure printing. The metal conductive paste for forming the internal electrode contains an organic binder. A plurality of internal electrode layer patterns are alternately exposed to a pair of external electrodes. Ceramic particles are added as a co-material to the metal conductive paste. The main component of the ceramic particles is not particularly limited, but is preferably the same as the main component ceramic of the dielectric layer 11. For example, $BaTiO_3$ of which an average grain diameter is 50 nm or less may be evenly dispersed.

After that, the dielectric green sheet on which the internal electrode layer pattern is printed is stamped into a predetermined size, and a predetermined number (for example, 100 to 1000) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets to be the cover layers 13 are clamped on the upper face and the lower face of the stacked dielectric green sheets in the stacking direction. And, the resulting multilayer structure is cut into a predetermined chip size (for example, 1.0 mm×0.5 mm).

[Firing Process]

The binder is removed from the resulting ceramic multilayer structure in $N_2$ atmosphere. After that, metal paste to be the base layer of the external electrodes 20a and 20b is painted by a dipping method. The resulting ceramic multilayer structure is fired in a reducing atmosphere with an oxygen partial pressure of $10^{-12}$ to $10^{-9}$ MPa in a temperature range of 1160° C. to 1280° C. for 5 minutes to 10 minutes.

[Re-Oxidation Process]

In order to return the oxygen into the barium titanate acting as the main phase of the dielectric layers 11 which are fired in the reductive atmosphere and is partially reduced, a thermal process may be performed in a mixed gas of $N_2$ and moisture at approximately 1000 degrees C. or in a normal atmosphere at 500 degrees C. to 700 degrees C. so that the internal electrode layers 12 are not oxidized. The process is called a re-oxidation process.

[Plating Process]

After that, metal layers such as Cu, Ni, Sn or the like may be formed on the base layers of the external electrodes 20a and 20b by plating. With the processes, the multilayer ceramic capacitor 100 is fabricated.

In order to reduce the average pore diameter of the internal electrode layer 12, for example, the particle diameter of the main component metal particles in the metal conductive paste for forming the internal electrode layer 12 is reduced, and the average temperature elevation rate from room temperature to the maximum temperature at the time of firing is reduced. Thus, the growth of the pores in the internal electrode layer 12 is suppressed. Alternatively, it is conceivable to add particles made of a material having a high melting point to the metal conductive paste. For example, the particle diameter of the main component metal particles in the metal conductive paste for forming the internal electrode layer 12 is ½ or less of the thickness of the internal electrode layer 12. For example, metal particles having a particle diameter of 100 nm or less may be used as the main component metal particles. More preferably, metal particles having a particle diameter of 50 nm or less may be used as the main component metal particles. Alternatively, the average temperature elevation rate from room temperature to the maximum temperature at the time of firing is 100° C./sec or more, more preferably 200° C./sec or more. Alternatively, molybdenum (Mo), niobium (Nb), tantalum (Ta), and tungsten (W) are used as the high melting point material to be added to the metal conductive paste.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer structure in which each of a plurality of dielectric layers of which a main component is ceramic and each of a plurality of internal electrode layers having pores are alternately stacked,
wherein a continuity modulus of at least one of the plurality of internal electrode layers is 80% or less, and
wherein an average pore diameter of the pores of the at least one of the plurality of internal electrode layers is equal to or less than each thickness of the plurality of dielectric layers.

2. The ceramic electronic device as claimed in claim 1, wherein the continuity modulus is 50% or more.

3. The ceramic electronic device as claimed in claim 1 wherein the average pore diameter is 100 μm or less.

4. The ceramic electronic device as claimed in claim 1, wherein an average thickness of the plurality of dielectric layers is 0.1 μm or more and 10 μm or less.

5. The ceramic electronic device as claimed in claim 1, wherein an average thickness of the plurality of internal electrode layers is 0.1 μm or more and 3 μm or less.

6. The ceramic electronic device as claimed in claim 1,
wherein the average pore diameter is defined as $4/\pi \times \Sigma Dm/m$, when a number of the pores in an observation area of a cross section of one selected internal electrode layer of the plurality of internal electrode layers is "m", and a total length of the pores is $\Sigma Dm$.

7. The ceramic electronic device as claimed in claim 6,
wherein the average pore diameter is calculated by extracting pores having a length of 1/10 or more of an average thickness of the plurality of dielectric layers.

8. The ceramic electronic device as claimed in claim 1,
wherein each thickness of the plurality of dielectric layers is 1 μm or less, and
wherein the average pore diameter of the pores is 1 μm or less.

* * * * *